United States Patent [19]

Kuznetz

[11] Patent Number: 4,501,025

[45] Date of Patent: Feb. 26, 1985

[54] COMPOSITE FABRIC FOR SPORTSWEAR

[76] Inventor: Lawrence Kuznetz, 66 Joyce Rd., Plainview, N.Y. 11803

[21] Appl. No.: 518,133

[22] Filed: Jul. 28, 1983

[51] Int. Cl.$^3$ .............................................. H41D 27/08
[52] U.S. Cl. ....................................... 2/243 A; 2/113
[58] Field of Search ..................... 2/243 A, 74, 87, 97, 2/113, 2; 428/311

[56] References Cited

U.S. PATENT DOCUMENTS 4,338,686  7/1982  Bell ............................................. 2/2

Primary Examiner—Doris L. Troutman
Attorney, Agent, or Firm—Michael Ebert

[57] ABSTRACT

An article of sportswear formed by a composite fabric which, when worn by an athlete undergoing strenuous physical activity, functions to regulate the factors giving rise to perspiration and evaporative cooling in a manner conductive to optimum performance. The composite fabric which is foraminated to afford air ventilation is composed of a hydrophobic inner layer in contact with the skin of the wearer and a hydrophilic outer layer exposed to the atmosphere. The inner layer is formed of non-absorbing fibers which act to convey perspiration away from the skin to the second layer, these fibers having a black pigmentation to absorb infrared energy emitted by the wearer. The second layer is formed of absorbent fibers functioning to absorb the perspiration conveyed thereto and to disperse this perspiration throughout the exposed surface thereof to promote evaporative cooling at a controlled rate. The surface of the outer layer is metallized to reflect incident light and thereby minimize solar heating of the athlete.

7 Claims, 3 Drawing Figures

COMPOSITE FABRIC FOR SPORTSWEAR

BACKGROUND OF INVENTION

Field of Invention

This invention relates generally to fabrics for sportswear, and in particular to sportswear which when worn by an athlete during strenuous physical activity, functions to regulate the factors causing perspiration and evaporative cooling in a manner conducive to optimum performance.

The clothing worn by an athlete in competitive play in the course of which he undergoes strenuous physical activity, may adversely affect his (or her) performance. Because the fabric of wearing apparel more or less conforms to the skin of the wearer and is interposed between the skin and the atmosphere, it therefore acts effectively as a heat exchanger or thermal barrier, depending on its inherent characteristics. If the clothing functions as a thermal barrier to retard the dissipation of heat from the body of the athlete, this may cause the body to overheat and thereby degrade the athlete's performance. But if the clothing functions to promote rapid evaporative cooling to an excessive extent, the clothing may then also adversely affect the athlete's performance.

The interior of the human body has a normal temperature level which is usually said to be 98.6° F. But actually, in the course of each 24-hour period, the body temperature rises above and falls below this nominal value within a 5° F. range. On hot days, during strenuous exercise, body temperature as high as 108° F. has been routinely observed with no apparent ill effects. Body temperature is determined by the relationship existing between the amount of heat internally generated, which depends on basal metabolism, and the amount of heat escaping from the body. Additional heat is produced as a result of muscular activity, this being dissipated by an increase in radiation, conduction or evaporation from the skin surface and by more rapid and deep breathing. Thus the skin is the interface between the internally heated body and the atmosphere.

Though a fabric in accordance with the invention is not limited to sportswear designed for athletes who enter games conducted in a relatively hot and sunny climate, we shall, for purposes of illustration, consider the environmental conditions expected to prevail at the Olympic Games to be held in late July and early August of 1984 in Los Angeles, Calif. In that region, this is the hottest time of the year. Furthermore, the Olympic stadium, because of its bowl shape, tends to trap the sun's rays and cause a greenhouse effect. The result is that the surface temperature during actual competition may be as high as 120° F., a condition fairly typical of dish-shaped stadiums in warm climates. Athletes who participate in these games must therefore recognize that not only will body heat be internally generated by strenuous physical activity, but exposure to the hot sun will further augment such heat. The resultant high level of body heat may militate against an effective performance.

In man, there are 500 to 3000 sweat glands per square inch of skin surface, depending on the part of the body. Even under normal conditions when the body is fairly cool, the skin loses fluid at a rate of about a pint a day. In order to cope with increased body heat, the sweat glands will be activated to regulate body temperature, and the athlete will begin to perspire more or less heavily. Perspiration is initially in the vapor state; but as perspiration increases, it assumes the liquid state. Because of evaporation taking place on the skin surface, heat energy is drawn from the body and therefore has a cooling effect. The rate of evaporation is a function of several variables including the ambient humidity and the velocity of air flow. Obviously, in a high wind, evaporation takes place much more rapidly than in a still atmosphere.

The danger in uncontrolled evaporative cooling by direct contact between the skin surface and the atmosphere, as would occur in the absence of sportswear, is that under some circumstances, a very rapid reduction in body temperature may be experienced, with resultant muscular contractions that may impair the athlete's performance and possibly give rise to injuries.

Because in sportswear, the fabric is interposed between the skin of the wearer and the atmosphere, the fabric affects the heat exchange relationship therebetween. Ideally, this fabric must take into account all of the factors which come into play in determining body temperature; for the amount of perspiration which is generated and evaporative cooling varies as a function of muscular activity, air temperature, humidity, ventilation, as well as the moisture permeability of the fabric.

SUMMARY OF INVENTION

In view of the foregoing, the main object of this invention is to provide a composite fabric for sportswear which when worn by an athlete undergoing strenuous physical activity functions to regulate the factors which cause perspiration and evaporative cooling in a manner conducive to optimum performance.

More particularly, an object of this invention is to provide a sportswear fabric which minimizes those factors which stimulate body perspiration and the discomfort caused thereby, while maximizing the effect of perspiration on the proper adjustment of body temperature.

Also an object of the invention is to provide a composite fabric which significantly reduces the effect of solar heating the body of the wearer.

Another object of this invention is to provide a fabric of the above type which may be manufactured at low cost and which is strong and durable.

Briefly stated, these objects are attained in an article of sportswear formed by a composite fabric which, when worn by an athlete undergoing strenuous physical activity, functions to regulate the factors giving rise to perspiration and evaporative cooling in a manner conducive to optimum performance. The composite fabric which is foraminated to afford air ventilation is composed of a hydrophobic inner layer in contact with the skin of the wearer and a hydrophilic outer layer exposed to the atmosphere. The inner layer is formed of non-absorbing fibers which act to convey perspiration away from the skin to the second layer, these fibers having a black pigmentation to absorb infrared energy emitted by the wearer. The second layer is formed of absorbent fibers functioning to absorb the perspiration conveyed thereto and to disperse this perspiration throughout the exposed surface thereof to promote evaporative cooling at a controlled rate. The surface of the outer layer is metallized to reflect incident light and thereby minimize solar heating of the athlete.

OUTLINE OF DRAWINGS

For a better understanding of the invention as well as other objects and further features thereof, reference is made to the following detailed description to be read in conjunction with the accompanying drawings, wherein.

Figure 3:
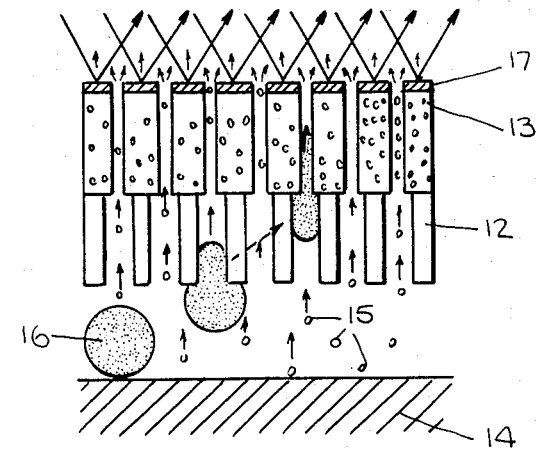

FIG. 3 schematically illustrates the composite fabric and how it functions.

DESCRIPTION OF INVENTION

Figure 1:
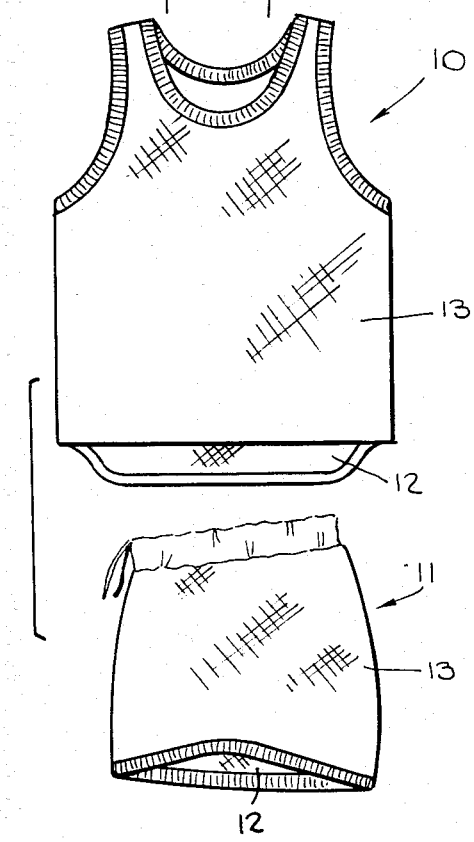
FIG. 1 shows a two-piece running outfit made of a composite fabric in accordance with the invention.
Figure 2:
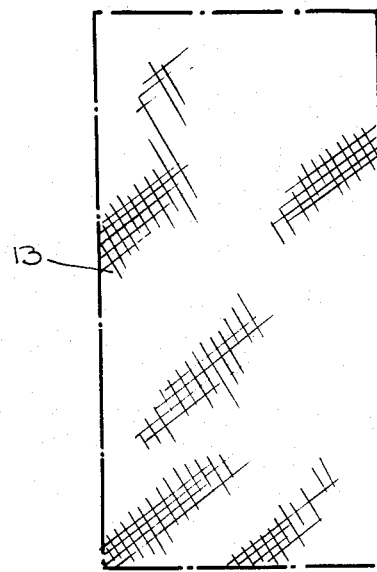
FIG. 2 is a plan view of the fabric.

Referring now to FIG. 1, there is shown a running outfit made of a composite fabric in accordance with the invention, the outfit consisting of a sleeveless shirt 10 and a pair of shorts 11. Both pieces are fabricated of a composite fabric having an inner layer 12 which makes direct contact with the skin of the wearer, and an outer layer 13 which is exposed to the atmosphere. It is to be understood that this running outfit is by way of illustration only, and that the fabric may be incorporated into any existing type of sportswear, including field jackets and trousers.

The composite fabric is foraminated to permit air ventilation therethrough. The fabric pores may be produced by an open weave or open knit mesh construction. In practice, in order to produce a composite fabric having an inner layer of one filamentary material and outer layer of another and distinctly different material, use may be made of a double weave technique, with two systems of warp or filling threads so combined that only one is visible on either side. One can also produce a two layer fabric by double knitting techniques.

Inner layer 12 has hydrophobic characteristics and is composed of synthetic fibers such as polyester, polyolefin or Dacron fibers having an extremely low moisture content. These synthetic fibers are formed with a black pigment so that the inner layer also functions to absorb infrared radiation emitted from the body of the wearer. Such radiation is at a relatively high level during strenuous physical activity and its absorption acts to reduce body temperature.

Because the fibers of the inner layer are hydrophobic, they do not absorb perspiration from the skin of the wearer, but are permeable to such perspiration and act, therefore, to convey the perspiration both in the vapor and liquid state to the outer layer 13.

In FIG. 3, the small dots 15 symbolize vapor emitted from the skin 14 of the wearer, whereas the large spheres 16 represent moisture; that is, liquid perspiration. Both the vapor and the moisture are transmitted to the outer layer 13 along the non-absorbent surface of the fibers of the inner layer and through the interstices therebetween.

Outer layer 13 has hydrophilic characteristics and is composed of moisture and water absorbing natural fibers such as cotton or wool, or synthetic fibers such as viscose rayon. Also, synthetic fine spun fibers which are highly absorbent may be used for this purpose.

Thus the vapor and moisture resulting from perspiration on the skin of the athlete are conveyed by inner layer 12 to outer layer 13 and are absorbed thereby. This layer has a high degree of absorption and a relatively large surface area so that, in practice, even with a heavily sweating athlete, the outer layer is not saturated. The moisture absorbed in the outer layer which has wicking properties is more or less uniformly dispersed throughout this layer. Consequently, even though a given body zone exudes far more perspiration than another body region covered by the same fabric, the resultant moisture is not concentrated in the fabric area lying against this zone, but is dispersed throughout the fabric to promote evaporative cooling over a relatively broad area. This acts to cool the entire body, rather than a particular region thereof.

The surface of outer layer 13 is printed or otherwise coated, as by sputtering, with an extremely thin coating 17 of reflective material such as aluminum. This coating functions to reflect ultraviolet and all other radiation in the spectrum of light rays impinging on this layer; hence the layer functions to minimize solar heating of the wearer.

Thus a composite fabric in accordance with the invention takes into account virtually all factors which are operative when the athlete undergoes strenuous activity under the sun.

The metallic coating on the exposed surface of the composite fabric minimizes the effect of external heat from the sun on the wearer. The foraminated or openmesh fabric affords air ventilation so that at no time is there a build-up of perspiration on the skin of the wearer to give him a clammy and uncomfortable feeling. The black pigmented inner layer absorbs infrared energy emitted from the internally-heated athlete to thereby reduce body heat, and the transmittal of perspiration through the non-absorbent inner layer to the absorbent outer layer gives rise to controlled evaporative cooling over a relatively broad area to reduce the body temperature of the athlete at a controlled rate without undue cooling that might result in muscular contractions.

Thus the action of the metallic coating to exclude external heat, and the action of the blackened inner layer to draw away internal heat from the body, serve to significantly delay the onset of perspiration; and when perspiration does take place, the layers of the composite fabric function to effect controlled cooling so that excessive body heat is avoided even under strenuous physical activity.

While there has been shown and described a preferred embodiment of a composite fabric for sportswear in accordance with the invention, it will be appreciated that many changes and modifications may be made therein without, however, departing from the essential spirit thereof.

I claim:

1. An article of sportswear fabricated of a composite fabric which when worn by an athlete undergoing strenuous physical activity, functions to regulate the factors causing perspiration and evaporative cooling in a manner conducive to optimum performance; said fabric comprising:

A a porous open weave hydrophobic inner fabric inner layer in contact with the skin of the wearer and formed on non-absorbing black-hued fibers which act to absorb infrared energy emitted by the wearer and to transmit perspiration away from the skin;

B a porous open weave hydrophilic outer fabric layer joined to the inner layer and exposed to the atmosphere to receive the transmitted perspiration from the inner layer, said outer layer being formed of absorbent fibers having good wicking properties which act to absorb the transmitted perspiration and to disperse it throughout the exposed surface of the outer layer to promote evaporative cooling at a controlled rate; and C a metallic coating formed on the exposed surface of the outer layer to reflect ultraviolet radiation impinging thereon.

2. A fabric as set forth in claim 1, wherein said layers are produced by a double-weave technique to form the inner layer on one side and the outer layer on the opposite side.

3. A fabric as set forth in claim 1, wherein said coating is aluminum printed on said exposed surface.

4. A fabric as set forth in claim 1, wherein said outer layer is formed of a natural fiber.

5. A fabric as set forth in claim 4, wherein said natural fiber is cotton.

6. A fabric as set forth in claim 1, wherein said inner layer is formed of a synthetic fiber.

7. A fabric as set forth in claim 6, wherein said fiber is polyester.

* * * * *

UNITED STATES PATENT OFFICE
CERTIFICATE OF CORRECTION

Patent No. 4,501,025          Dated February 26, 1985

Inventor(s) Lawrence Kuznetz

It is certified that error appears in the above-identified patent and that said Letters Patent are hereby corrected as shown below:

Col. 4, line 58:    change "on" to --of--.

Signed and Sealed this

Eleventh Day of June 1985

[SEAL]

Attest:

DONALD J. QUIGG

Attesting Officer      Acting Commissioner of Patents and Trademarks